(12) United States Patent
Nachi et al.

(10) Patent No.: US 8,423,859 B2
(45) Date of Patent: Apr. 16, 2013

(54) TERMINAL DEVICE, TERMINAL DEVICE CONTROL METHOD, AND STORAGE MEDIUM

(75) Inventors: Kazuma Nachi, Minato-ku (JP); Shinichi Yamada, Kawasaki (JP)

(73) Assignees: NEC Corporation, Tokyo (JP); Renesas Electronics Corporation, Kanagawa (JP)

( * ) Notice: Subject to any disclaimer, the term of this patent is extended or adjusted under 35 U.S.C. 154(b) by 393 days.

(21) Appl. No.: 12/747,787

(22) PCT Filed: Dec. 3, 2008

(86) PCT No.: PCT/JP2008/071986
§ 371 (c)(1),
(2), (4) Date: Jun. 11, 2010

(87) PCT Pub. No.: WO2009/081708
PCT Pub. Date: Jul. 2, 2009

(65) Prior Publication Data
US 2011/0276853 A1 Nov. 10, 2011

(30) Foreign Application Priority Data
Dec. 20, 2007 (JP) .................................. 2007-328454

(51) Int. Cl.
*G06F 11/00* (2006.01)

(52) U.S. Cl.
USPC ........................................................... 714/752

(58) Field of Classification Search .................. 714/752
See application file for complete search history.

(56) References Cited

U.S. PATENT DOCUMENTS

| | | | |
|---|---|---|---|
| 2007/0011557 A1* | 1/2007 | Zheng et al. .................. | 714/752 |
| 2008/0298467 A1* | 12/2008 | Sallinen et al. ........... | 375/240.25 |
| 2009/0136145 A1* | 5/2009 | Morimoto et al. ............ | 382/233 |
| 2009/0164655 A1* | 6/2009 | Pettersson et al. ............ | 709/231 |
| 2011/0276856 A1* | 11/2011 | Litsyn et al. .................. | 714/752 |

FOREIGN PATENT DOCUMENTS

| | | |
|---|---|---|
| JP | 11-136684 A | 5/1999 |
| JP | 2004-048311 A | 2/2004 |
| JP | 2006-262016 A | 9/2006 |
| JP | 2007-166129 A | 6/2007 |
| JP | 2007-215099 A | 8/2007 |

* cited by examiner

Primary Examiner — Marc Duncan
(74) Attorney, Agent, or Firm — Sughrue Mion, PLLC

(57) ABSTRACT

It is possible to provide a terminal device, a terminal device control method, and a recording medium which enables an error correction without modifying hardware. The terminal device receives a data stream formed in the NAL Unit by a hard decoder based on the H.264 standard. The terminal device includes error correction means which analyzes data encoded in the data stream by software and performs an error correction before inputting the data to the hard decoder.

7 Claims, 2 Drawing Sheets

TERMINAL DEVICE, TERMINAL DEVICE CONTROL METHOD, AND STORAGE MEDIUM

TECHNICAL FIELD

The present invention relates to a terminal device, a terminal device control method, and a storage medium.

BACKGROUND ART

In recent years, with the start of terrestrial digital broadcasts and one-segment (one segment: one segment receiving services targeted for cell phones and mobile terminals) broadcasts (hereafter collectively referred to as "digital broadcasts"), terminal devices have been developing that can receive image streams such as digital broadcasts.

Examples of technology related to such terminal devices include content playback devices. The content playback devices play back a content distributed from a server storing pieces of contents via the Internet and an example thereof is described in Patent Document 1.

The content playback device described in Patent Document 1 is "a content playback device provided with a decoder and having functions of decoding content data received from a content-storing server via a network using the decoder and playing back content according to the content data and includes: determination means that determines whether content data received from the content-storing server conforms to a first format decodable by the decoder or a second format not decodable by the decoder; conversion means that converts content data according to the second format into content data according to the first format; and decoding target change means that, if the received content data conforms to the first format, considers the received content data as a decoding target of the decoder and if the received content data conforms to the second format, converts the received content data into the first format using the conversion means and then considers the converted content data as a decoding target of the decoder," and operates as follows.

The content playback device includes, as firmware, a software encoder that can be updated as appropriate. If the content playback device transmits a request for transmission of music data, to the content-storing server and then receives music data transmitted by the content-storing server in response to the request and the received music data is a codec supported by the decoder, the content playback device sends the received music data to the decoder to play back the music. If the received music data is a codec not supported by the decoder, the content playback device encodes the received music data into music data conforming to a codec supported by the decoder using the software encoder and then sends the encoded data to the decoder to play back the music.

[Patent Document 1]
Japanese Unexamined Patent Application Publication No. 2007-215099

DISCLOSURE OF INVENTION

Technical Problem

Incidentally, when the terminal device receives a digital broadcast, the received data stream contains errors depending on the receiving sensitivity of the terminal device. If the digital broadcast contains images, direct decoding of the error stream may disturb the images, stop updates of the images, or place the hardware (hereafter also referred to as "HW") in an error state. For this reason, decoding of the error stream is unfavorable.

The existing media-playback HW cannot perform error correction specializing in a particular digital broadcast. However, in an effort to realize a digital broadcast receiving terminal using HW, it takes much time to replace or correct only the image decoder HW (hardware decoder) with or to that specializing in digital broadcasts. Also, the optimum image stream error correction algorithm may vary depending on the digital broadcasting systems. Accordingly, implementation of such algorithms using pieces of HW provides problems such as wastefulness.

Accordingly, an object of the present invention is to provide a terminal device, a terminal device control method, and a storage medium that can correct errors without making a change to the hardware.

Technical Solution

A device according to the present invention is a terminal device that receives a data stream including a NAL Unit by using a hard decoder conforming to the H.264 standard and is characterized in that a terminal device includes error correction means for analyzing encoded data contained in the data stream on software, correcting errors, and then inputting the error-corrected data into the hard decoder.

A method according to the present invention is a method for controlling a terminal device that receives a data stream including a NAL Unit by using a hard decoder conforming to the H.264 standard and is characterized in that a terminal device control method includes analyzing encoded data contained in the data stream, correcting errors, and then inputting the data into the hard decoder.

A storage medium according to the present invention is a storage medium storing a program for controlling a terminal device that receives a data stream including a NAL Unit by using a hard decoder conforming to the H.264 standard, the storage medium being characterized in that the stored control program causes a computer to perform: a process of analyzing encoded data contained in the data stream; a process of correcting an error; and a process of inputting the error-corrected data into the hard decoder after the error correction process.

Advantageous Effects

According to the present invention, a terminal device, a terminal device control method, and a storage medium can be provided that can perform error correction without making a change to the hardware.

BEST MODE FOR CARRYING OUT THE INVENTION (Characteristics)

A terminal device according to the present invention solves the problems by placing an H.264 simplified (software) encoder and an H.264 simplified (software) decoder in the stages preceding H.264 decoder HW, which is the existing media-playback HW, without replacing or correcting the H.264 decoder HW. For example, a stream is analyzed by the simplified (software) decoder before the stream is inputted into the H.264 decoder. Thus, a normal image output can be obtained by correcting the errors without making a change to the existing H.264 decoder.

That is, this terminal device is characterized in that the existing media-playback H.264 decoder can be used as it is, that errors can be corrected without changing the media-playback HW, and that streams are re-encoded to correct errors.

An embodiment of the terminal device according to the present invention is a terminal device that receives a data stream including a NAL Unit by using a hard decoder conforming to the H.264 standard and is characterized in that the terminal device includes error correction means for analyzing encoded data contained in the data stream on software, correcting errors, and then inputting the error-corrected data into the hard decoder.

According to the above-mentioned configuration, the terminal device that receives a data stream including a NAL Unit by using a hard decoder conforming to the H.264 standard includes error correction means for analyzing encoded data contained in the data stream on software, correcting errors, and then inputting the error-corrected data into the above-mentioned hard decoder. Accordingly, a data stream is analyzed and errors are corrected by a software decoder and a software encoder before the data stream is inputted into the hardware decoder. Thus, a normal output image can be obtained by correcting the error while using the existing media-playback hardware decoder as it is without taking a time for correcting the hardware decoder. That is, the errors can be corrected without making a change to the hardware.

Another embodiment of the terminal device according to the present invention is characterized in that, the terminal device includes, in addition to the above-mentioned configuration, a software decoder that decodes the data and checks whether there is an error, a software encoder that corrects an erroneous parameter to a proper parameter, and a software control unit that inputs the corrected data into the hardware decoder and controls the software decoder and the software encoder.

Yet another embodiment of the terminal device according to the present invention is characterized in that, in addition to the above-mentioned configuration, the software control unit includes means for determining whether the data includes a particular NAL Unit, means for inputting the data into the hardware decoder if the data does not include the particular NAL Unit, causing the software decoder to decode part of the data if the data includes the particular NAL Unit and thus determining whether the NAL Unit violates a predetermined standard, inputting the data into the hardware decoder if the particular NAL Unit does not violate the predetermined standard, and correcting a parameter violating the standard to a proper value if the particular NAL Unit violates the predetermined standard, and causes the software encoder to encode the corrected parameter.

Still another embodiment of the terminal device according to the present invention is characterized in that, in addition to the above-mentioned configuration, the data is image data for use in a one-segment broadcast or image data for use in a terrestrial digital broadcast and that the predetermined standard is a standard related to image data for use in a one-segment broadcast or image data for use in a terrestrial digital broadcast.

An embodiment of a terminal device control method according to the present invention is a method for controlling a terminal device that receives a data stream including a NAL Unit by using a hard decoder conforming to the H.264 standard and is characterized in that the terminal device control method includes analyzing encoded data contained in the data stream, correcting errors, and then inputting the data into the hard decoder.

According to the above-mentioned configuration, the terminal device that receives a data stream including a NAL Unit by using a hard decoder conforming to the H.264 standard includes error correction means for analyzing encoded data contained in the data stream on software, correcting errors, and then inputting the data into the hard decoder. Accordingly, a data stream is analyzed and errors are corrected by a software decoder and a software encoder before the data stream is inputted into the hardware decoder. Thus, a normal output image can be obtained by correcting the errors while using the existing media-playback hardware decoder as it is without taking a time for correcting the hardware decoder. That is, the errors can be corrected without making a change to the hardware.

Another embodiment of the terminal device control method according to the present invention is characterized in that, in addition to the above-mentioned configuration, the terminal device control method includes decoding data, checking whether there is an error, correcting an erroneous parameter to a proper parameter, and inputting the corrected data into the hardware decoder.

Yet another embodiment of the terminal device control method according to the present invention is characterized in that, in addition to the above-mentioned configuration, the terminal device control method includes determining whether the data includes a particular NAL Unit, inputting the data into the hardware decoder if the data does not include the particular NAL Unit, causing the software decoder to decode part of the data if the data includes the particular NAL Unit and thus determining whether the NAL Unit violates a predetermined standard, inputting the data into the hardware decoder if the particular NAL Unit does not violate the predetermined standard, and correcting a parameter violating the standard to a proper value if the particular NAL Unit violates the predetermined standard, and causing the software decoder to encode the corrected parameter.

In still another embodiment of the terminal device control method according to the present invention, in addition to the above-mentioned configuration, the data may be image data for use in a one-segment broadcast or image data for use in a terrestrial digital broadcast and the predetermined standard may be a standard related to image data for use in a one-segment broadcast or image data for use in a terrestrial digital broadcast.

(Control Program and Storage Media)

The above-mentioned terminal device according to the present invention is realized by a program for causing a computer to perform processes. Examples of such a computer include general-purpose computers such as personal computers and workstations, but the present invention is not limited thereto.

An embodiment of a program for controlling a terminal device according to the present invention is a program for controlling a terminal device that receives a data stream including a NAL Unit by using a hard decoder conforming to the H.264 standard and causes a computer to perform (1) a process of analyzing encoded data contained in the data stream,
(2) a process of correcting errors, and
(3) a process of inputting the data into the hard decoder after the error correction process.

According to the above-mentioned configuration, the terminal device that receives a data stream including a NAL Unit by using a hard decoder conforming to the H.264 standard includes error correction means for analyzing encoded data contained in the data stream on software, correcting errors, and then inputting the data into the hard decoder. Accordingly, the data stream is analyzed and errors are corrected by a software decoder and a software encoder before the data stream is inputted into the hardware decoder. Thus, a normal output image can be obtained by correcting the errors while using the existing media-playback hardware decoder as it is without taking a time for correcting the hardware decoder. That is, the errors can be corrected without making a change to the hardware.

Another embodiment of the program for controlling a terminal device according to the present invention may cause the computer to perform, in addition to the above-mentioned configuration, (4) a process of decoding the data and checking whether there is an error, by using a software decoder,
(5) a process of correcting an erroneous parameter to a proper parameter using a software encoder, and
(6) a process of inputting the corrected data to the hardware decoder.

Yet another embodiment of the program for controlling a terminal device according to the present invention may cause the computer to perform, in addition to the above-mentioned configuration, (7) a process of determining whether the data includes a particular NAL Unit,
(8) a process of inputting the data into the hardware decoder if the data does not include the particular NAL Unit,
(9) a process of causing the software decoder to decode part of the data if the data includes the particular NAL Unit and thus determining whether the NAL Unit violates a predetermined standard,
(10) a process of inputting the data into the hardware decoder if the particular NAL Unit does not violate the predetermined standard,
(11) a process of correcting a parameter violating the standard to a proper value if the particular NAL Unit violates the predetermined standard, and
(12) a process of causing the software decoder to encode the corrected parameter.

In still another embodiment of the program for controlling a terminal device according to the present invention, in addition to the above-mentioned configuration, the data may be image data for use in a one-segment broadcast or image data for use in a terrestrial digital broadcast and the predetermined standard may be a standard related to image data for use in a one-segment broadcast or image data for use in a terrestrial digital broadcast.

Thus, with only a computer environment where the control program is executable, the terminal device according to the present invention can be realized anywhere.

Such a program may be stored in a computer-readable storage medium.

Examples of such a storage medium include computer-readable storage media such as a CD-ROM (compact disc read only memory), a flexible disk (FD), CD-R (CD recordable), and DVD (digital versatile disk), semiconductor memories such as an HDD (hard disc drive), flash memory, RAM (random access memory), ROM (read only memory), and Fe RAM (ferroelectric memory), and an HDD (hard disc drive).

The above-mentioned embodiments are only illustrative of a preferred embodiment of the present invention and do not limit the present invention. Various changes can be made thereto without departing from the spirit and scope of the invention.

Mode for the Invention 1

(Configuration)

FIG. 1 shows a block diagram of an embodiment of a terminal device to which the terminal device control method according to the present invention is applied.

In the drawing, reference numeral 1 represents a digital broadcast receiving information terminal, which is a terminal device for receiving digital broadcasts. The digital broadcast receiving information terminal 1 has media-playback HW (H.264 decoder HW) 4 mounted thereon. Placed in the stages preceding the media-playback HW 4 are a software encoder 3, a software decoder 2, and a software control unit 5 for controlling the software decoder 2, software decoder, and media-playback HW 4.

A system portion essential for digital broadcasts, including a tuner and a DEMUX (demultiplexer), is referred to as a digital broadcast receiving system unit 6. Signals pass through different paths depending on data, as shown by the solid-line arrow and wave-line arrow.

The software decoder 2 has functions of decoding data and checking whether there is an error. The software encoder 3 has a function of correcting an erroneous parameter to a proper parameter. Examples of the media-playback HW 4 as a hardware decoder include the existing H.264 decoder. The software control unit 5 is composed of, for example, a microprocessor and causes the software encoder 3 to encoder the corrected parameter, as well as centrally controls the digital broadcast receiving terminal 1.

The software control unit 5 is composed of software including means for determining whether the data includes a particular NAL Unit and means for inputting the data into the hardware decoder if the data does not include the particular NAL Unit, causing the software decoder to decode part of the data if the data includes the particular NAL Unit and thus determining whether the particular NAL Unit violates a standard, inputting the data into the hardware decoder if the particular NAL Unit does not violate the standard, and correcting a parameter violating the standard to a proper value if the particular NAL Unit violates the standard.

The software encoder 3, media-playback HW 4, and software control unit 5 constitute error correction means.

(Description of Operation)

A series of flow of an embodiment of the terminal device control method according to the present invention will be described using FIGS. 1 and 2. FIG. 2 is an example of a flowchart showing the terminal device control method according to the present invention.

Inside the digital broadcast receiving terminal, the software control unit 5 including error correction control software receives an H.264 stream from the digital broadcast system 6 (step S1).

The software control unit 5 determines whether the received H.264 stream includes a particular (error-correctable) NAL Unit (step S2).

If errors can be corrected, the software control unit 5 passes the stream on to the software decoder 2, which then decodes part of the stream (step S3).

The software decoder 2 checks the particular parameter values of the NAL Unit, such as NAL header, AUD (access unit delimiter), SPS (sequence parameter set), and PPS (picture parameter set) and determines whether any of the particular parameter values violates a standard (step S4).

If any parameter value violates the standard (step S4: Yes), the software decoder 2 corrects the parameter value to a proper value (step S5).

The software encoder 3 encodes the corrected value (S6). As a result, the stream containing the error is corrected to a proper stream.

The error-corrected stream is inputted into the existing media-playback HW 4 (step S7) and decoded (step S8).

Since the stream is an error-corrected stream, a normal output image is obtained from the media-playback HW 4 (step S9).

(Explanation of Advantageous Effect)

As seen above, according to the present invention, a stream is analyzed and errors are corrected by the software decoder and software encoder before the stream is inputted into the media-playback HW 4. Thus, a normal output image can be obtained by correcting the errors while using the existing media-playback HW 4 for playing back media as it is without taking a time for the error correction.

While correction of the errors contained in the H.264 stream, an image stream for use in a one-segment broadcast, has been described in this embodiment, the present invention is not limited thereto and may be applied to processing of an image for use in a terrestrial digital broadcast.

The invention described in Patent Document 1 is an invention related to a general technology, music transcoder, and converts, for example, a first format, MP3, into a second format, AAC, and does not change parameters as in this application. Also, the invention described in Patent Document 1 does not correct errors and only converts a format into another, so it cannot convert a format containing errors. To perform such re-conversion requires a decoder that can decode the second format; however, Patent Document 1 does not describe such a decoder. If such a decoder is included, this system is not needed originally.

On the other hand, this application corrects errors contained in an image stream. Since digital broadcasts such as one-segment contain errors depending on the receiving sensitivity of the terminal, this application is intended to correct the errors to display normal images. A one-segment image stream, H.264, can be decoded by an HW decoder originally. To change the HW requires a time. This application is advantageous in that it makes no change to the HW.

As described above, according to the present invention, the terminal device that receives a data stream including a NAL Unit by using a hard decoder conforming to the H.264 standard includes error correction means for analyzing encoded data contained in the data stream on software, correcting errors, and then inputting the data into the hard decoder. Accordingly, the data stream is analyzed and errors are corrected by a software decoder and a software encoder before the data stream is inputted into the hardware decoder. Thus, a normal output image can be obtained by correcting the errors while using the existing media-playback hardware decoder as it is without taking a time for correcting the hardware decoder. That is, the errors can be corrected without making a change to the hardware.

This application claims priority based on Japanese Patent Application No. 2007-328454 filed on Dec. 20, 2007 and includes all the disclosure thereof.

EXPLANATION OF REFERENCE

Figure 1:
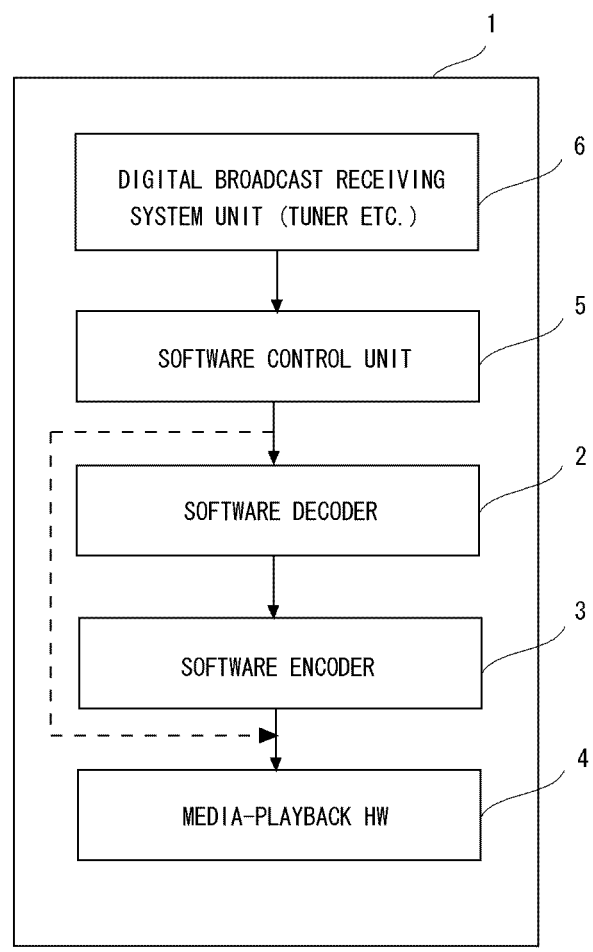
FIG. 1 is a block diagram showing an embodiment of a terminal device applied the terminal device control method according to the present invention.
Figure 2:
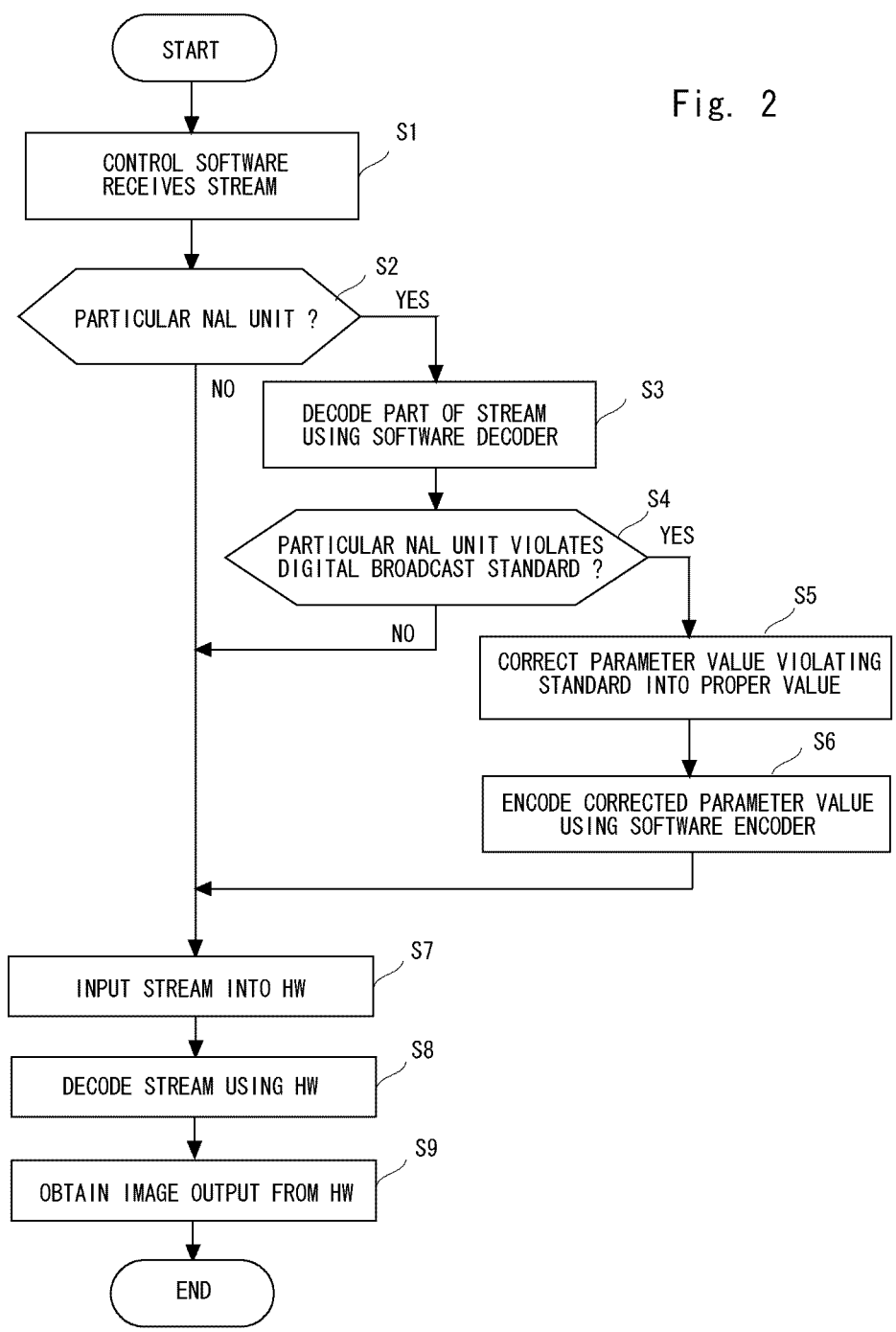
FIG. 2 is an example of a flowchart showing the terminal device control method according to the present invention.

1 TERMINAL DEVICE (DIGITAL BROADCAST RECEIVING TERMINAL)
2 SOFTWARE DECODER
3 SOFTWARE ENCODER
4 MEDIA-PLAYBACK HW
5 SOFTWARE CONTROL UNIT
6 DIGITAL BROADCAST RECEIVING SYSTEM UNIT

The invention claimed is:

1. A terminal device that receives a data stream including a NAL Unit by using a hard decoder conforming to the H.264 standard, the terminal device comprising:
   a software decoder that decodes encoded data contained in the data stream and checks whether there is an error;
   a software encoder that corrects an erroneous parameter to a proper parameter; and
   a software control unit that inputs the corrected data into the hardware decoder and controls the software decoder and the software encoder,
   wherein the software control unit includes a unit that determines whether the data includes a particular NAL Unit, a unit that inputs the data into the hardware decoder if the data does not include the particular NAL Unit causes the software decoder to decode part of the data if the data includes the particular NAL Unit and thus determines whether the NAL Unit violates a predetermined standard, inputs the data into the hardware a decoder if the particular NAL Unit does not violate the predetermined standard, and corrects a parameter violating the standard to a proper value if the particular NAL Unit violates the predetermined standard, and causes the software encoder to encode the corrected parameter.

2. The terminal device according to claim 1, wherein the data is image data for use in a one-segment broadcast or image data for use in a terrestrial digital broadcast and that the predetermined standard is a standard related to image data for use in a one-segment broadcast or image data for use in a terrestrial digital broadcast.

3. A method for controlling a terminal device, the terminal device receiving a data stream including a NAL Unit by using a hard decoder conforming to the H.264 standard, the method comprising:
   decoding the data;
   checking whether there is an error;
   correcting an erroneous parameter to a proper parameter;
   inputting the corrected data into the hardware decode;
   determining whether the data includes a particular NAL Unit;
   inputting the data into the hardware decoder if the data does not include the particular NAL Unit;
   causing the software decoder to decode part of the data f the data includes the particular NAL Unit and thus determining whether the NAL Unit violates a predetermined standard;
   inputting the data into the hardware decoder if the particular NAL Unit does not violate the predetermined standard;
   correcting a parameter violating the standard to a proper value if the particular NAL Unit violates the predetermined standard; and
   causing the software encoder to encode the corrected parameter.

4. The method for controlling a terminal device according to claim 3, wherein the data is image data for use in a one-segment broadcast or image data for use in a terrestrial digital broadcast and that the predetermined standard is a standard related to image data for use in a one-segment broadcast or image data for use in a terrestrial digital broadcast.

5. A non-transitory storage medium storing a program for controlling a terminal device that receives a data stream including a NAL Unit by using a hard decoder conforming to the H.264 standard, the storage medium comprising the stored control program causes a computer to perform:

a process of decoding the data and checking whether there is an error by using a software decoder;
a process of correcting an erroneous parameter to a proper parameter by using a software encoder;
a process of inputting the corrected data into the hardware decoder;
a process of determining whether the data includes a particular NAL Unit;
a process of inputting the data into the hardware decoder if the data does not include the particular NAL Unit;
a process of causing the software decoder to decode art of the data if the data includes the particular NAL Unit and thus determining whether the NAL Unit violates a predetermined standard;
a process of inputting the data into the hardware decoder if the particular NAL Unit does not violate the predetermined standard:
a process of correcting a parameter violating the standard to a proper value if the particular NAL Unit violates the predetermined standard; and
a process of causing the software encoder to encode the corrected parameter.

6. The non-transitory storage medium according to claim 5 wherein the data is image data for use in a one-segment broadcast or image data for use in a terrestrial digital broadcast and that the predetermined standard is a standard related to image data for use in a one-segment broadcast or image data for use in a terrestrial digital broadcast.

7. A terminal device that receives a data stream including a NAL Unit by using a hard decoder conforming to the H.264 standard, the terminal device comprising:

a software decoder that decodes encoded data contained in the data stream and checks whether there is an error;
a software encoder that corrects an erroneous parameter to a proper parameter; and
a software control means for inputting the corrected data into the hardware decoder and controls the software decoder and the software encoder,
wherein the software control means includes means for determining whether the data includes a particular NAL Unit means for inputting the data into the hardware decoder if the data does not include the particular NAL Unit causing the software decoder to decode part of the data if the data includes the particular NAL Unit and thus determining whether the NAL Unit violates a predetermined standard, inputting the data into the hardware decoder if the 'articular NAL Unit does not violate the predetermined standard, and correcting a parameter violating the standard to a proper value if the particular NAL Unit violates the predetermined standard, and causes the software encoder to encode the corrected parameter.

* * * * *